United States Patent [19]

Luly et al.

[11] Patent Number: 4,524,119

[45] Date of Patent: Jun. 18, 1985

[54] ELECTROPHOTOGRAPHIC CARRIERS INCORPORATING FLUORINATED CARBON AND PROCESS OF USING SAME

[75] Inventors: Matthew H. Luly, Lancaster; George D. Lockyer, Jr., Amherst; Richard E. Eibeck, Orchard Park, all of N.Y.; Joseph Gaynor, Arcadia, Calif.

[73] Assignee: Allied Corporation, Morris Township, Morris County, N.J.

[21] Appl. No.: 516,815

[22] Filed: Jul. 25, 1983

[51] Int. Cl.[3] ........................ G03G 9/10; B32B 15/04; B32B 19/04

[52] U.S. Cl. .................................... 430/108; 428/404; 428/407

[58] Field of Search ................. 430/108; 428/404, 407

[56] References Cited

U.S. PATENT DOCUMENTS 4,126,458 11/1978 Creatura et al. ................ 430/108 X 4,141,849 2/1979 Hasegawa et al. .................. 430/110

OTHER PUBLICATIONS

Japanese Patent Application No. 1975-64, 590-published Dec. 3, 1976, entitled "Carrier Coating Compositions for Electrostatic Photography".

*Primary Examiner*—Roland E. Martin

*Attorney, Agent, or Firm*—Jay P. Friedenson

[57] ABSTRACT

Novel electrophotographic development carrier particles for use with toner particles comprising a plurality of core particles coated with fluorinated carbon or a fluorinated carbon containing resin and an electrophotographic process comprising forming an electrostatic image on the surface of a photoconductive member and contacting the image with a developer mixture comprising finely divided toner particles mixed with such electrophotographic development carrier particles.

16 Claims, No Drawings

ELECTROPHOTOGRAPHIC CARRIERS INCORPORATING FLUORINATED CARBON AND PROCESS OF USING SAME

This invention relates to novel electrophotographic carriers and use of same in electrophotographic processes.

BACKGROUND OF THE INVENTION

In the electrophotographic process, an image of light and shadow areas is optically projected onto a charged photoconductor. The charge on the photoconductor dissipates in regions which are illuminated, while the charge is retained in those regions of the photoconductor which are not illuminated. The development step consists of the electrostatic attraction of charged toner particles to the electrostatic latent image on the photoconductor surface.

Several techniques have been developed for the development of the electrostatic latent image. The most common methods use relatively large carrier particles (about 50-1000 microns) to bring the smaller toner particles (about 1-50 microns) near the photoconductor surface. The carrier and toner particles are carefully chosen so that the toner particles will triboelectrically adhere to the surfaces of the carrier particles. The sign and magnitude of the triboelectric couple between the carrier and toner particles must be carefully chosen so that the toner particles will be electrostatically transferred only to the charged areas of the photoconductor. If the toner is transferred to the discharged areas of the photoconductor, objectionally high areas of background will result. If the surface of the carrier and toner are not each homogeneous, a range of triboelectric couples will be produced. Such a range may result in toner being deposited in inappropriate areas and reduced image quality.

Cascade development, as disclosed in U.S. Pat. No. 2,618,552, utilizes a two component carrier/toner system. The two component developer is poured or cascaded over the charged surface of the photoconductor.

U.S. Pat. No. 2,874,063 describes a method for developing an electrostatic image utilizing a magnetic brush. Ferromagnetic carrier particles tend to align themselves into long fibers or bristles under the influence of a magnetic field. Toner which triboelectrically adheres to the carrier can be transferred to the charged photoconductor by passing the magnetic brush over the surface of the photoconductor. The toner transfers to the photoconductor while the carrier remains attached to the brush.

Both the cascade and magnetic brush development methods subject the developer mix to violent agitation, rubbing, and abrasion. Under such conditions the toner particles gradually fragment and form physically adherent films on the carrier surface. As these films cover increasingly larger areas of the carrier surface, more toner-toner contact takes place with a consistent decrease in carrier-toner contact. This has the effect of changing the carefully engineered triboelectric couple and the developer eventually fails.

If the carrier is coated with an organic resin, the resin can crack and peel off. The carrier then presents at least two surfaces to the toner: carrier and pure resin. The toner can then be tribocharged by either of the two exposed carrier surfaces. Failure of the developer mix occurs because the triboelectric charge generated from the resin coating-toner contacts is different than the triboelectric charge developed from the uncoated carrier-toner contacts. The resulting range of triboelectric charge on the toner particles may result in toner being deposited on the photoconductor in inappropriate areas, thereby reducing print quality. The coated carriers may also fail due to buildup of toner films on the surface.

In both cascade and magnetic brush development, the developer is in intimate contact with the photoconductor surface. The developer is abrasive under these conditions and eventually wears out the photoconductor, which then must be replaced.

Developer mixes, particularly those with insulative carriers, often give poor fill-in of solid areas. Development electrodes are often required to overcome this problem. It is sometimes possible for a conductive carrier to act as its own development electrode or to improve the performance of an existing development electrode.

In both cascade and magnetic brush development, the developer is in motion. It is also advantageous to continually mix the developer with replenishment toner, thereby replacing toner removed from the system by the act of development. Both of these procedures are facilitated if the developer has good flow characteristics.

Coating carriers to give improved developers is known in the prior art. Uncoated carrier particles will be called carrier cores in this description. There are several advantages to coating carrier cores. Coated carriers often present a more uniform surface than uncoated cores. Coatings make possible the adjustment of the triboelectric couple with a given developer to a desired value. Coatings also can extend the lifetime of a developer mix. Some examples of coatings consisting solely or in part of organic fluoropolymers are given in U.S. Pat. Nos. 4,147,834; 3,947,271; 3,922,382; 3,918,968; 3,873,356; 3,873,355 and 3,778,262. These patents are primarily concerned with techniques for achieving negatively charged toner from fluoropolymer coated carriers and in extending the lifetime of the developer mix.

Additives are sometimes added to developer mixes instead of actually coating the carrier in an attempt to achieve similar benefits. U.S. Pat. No. 4,248,950 discloses that $MoS_2$, $WS_2$, $TiS_2$, PbO, and graphite are useful additives for prolonging the lifetime of the developer mix.

Carbon fluoride (fluorinated carbon) was reported as an additive to a fluoropolymer carrier coating agent in Japanese Patent Application No.: 1975-64, 590 entitled "Carrier Coating Composition for Electrostatic Photography", published Dec. 3, 1976. According to this disclosure, the carbon fluoride is added to a fluoropolymer carrier coating agent to improve its wear resistance. A non-fluorine containing resin may be used as a binder. When used as an "additive" in this manner, according to this disclosure, the amount of carbon fluoride employed does not exceed the weight % of the fluoropolymer coating agent employed. In other words the effective coating agent is the fluoropolymer; the carbon fluoride is merely an additive.

Graphite fluoride (fluorinated carbon) was also reported as an additive to both toner and the bulk developer mix in U.S. Pat. No. 4,141,849. The main purpose of the fluorinated carbon addition according to this patent is to provide stable charge control to the developer, enhance fluidity of developers and prevent toner from fusing to a photosensitive member. Japan Kokai Tokkyo Koho 78,147,542 describes a similar use of fluorinated carbon in conjunction with fibrous PTFE to afford toners with improved frictional and mechanical properties.

The object of the present invention is to provide a novel electrophotographic carrier which offers some practical advantages over prior art carriers and the use of such carriers in electrophotographic processes.

Other objects and advantages will be apparent from the following description.

SUMMARY OF THE INVENTION

It has been discovered that use of fluorinated carbon as the effective coating agent for carrier cores results in novel electrophotographic development carriers which offer several unexpected advantages over prior art carriers such as coated carrier cores where fluoropolymers are the effective coating agents.

The invention thus comprises novel electrophotographic development carrier particles for use with toner particles comprising a plurality of core particles coated with fluorinated carbon or a fluorinated carbon containing resin which resin is capable of binding the fluorinated carbon to the core particles without adversely affecting the desired triboelectric properties of the fluorinated carbon, with the proviso that said resin component does not include a fluorine containing resin in an amount equal to or greater than the fluorinated carbon component.

The novel process embodiment of the invention comprises an electrophotographic process comprising forming an electrostatic image on the surface of a photoconductive member and contacting the image with a developer mixture comprising finely divided toner particles mixed with the novel carrier particles of the invention as described above.

Fluorinated carbon, sometimes referred to as graphite fluoride or carbon fluoride, in a solid material resulting from the fluorination of carbon with elemental fluorine. The number of fluorine atoms per carbon atom may vary depending on the fluorination conditions.

A significant advantage of the use of fluorinated carbon as the effective coating agent in electrophotographic development carriers over prior art materials is that its varible fluorine atom to carbon atom stoichiometry allows a facile variation of its triboelectric properties. The triboelectric charge produced is a direct function of the number of fluorine atoms per carbon atom. This phenomenon allows a developer to be easily tailored to a specific toner and copier. In order to vary the triboelectric charge with the fluorocarbons and fluoropolymers of the prior art, modifiers must be used or a carefully controlled curing step has to be conducted. Use of fluorinated carbon only as an additive in carrier coating compositions comprising fluorine containing resins as the major and hence effective coating agent as disclosed in the above-mentioned Japanese Patent Application No.: 1975-64,590, does not afford this advantage since the presence of the major amount of fluorine containing resin substantially interferes with the ability to easily vary the triboelectric properties.

Another significant advantage of the use of fluorinated carbon in electrophotographic development carriers over prior art materials is the finding that the variable fluorine atom to carbon atom stoichiometry of fluorinated carbon unexpectedly permits systemic, uniform variation of its relatively low electrical resistivity properties. Controlled and low resistivity is a highly desired feature for an electrophotographic carrier coating. Low resistivity allows better fill-in and gray area development. This unexpected result offers a significant advantage in this art, which is that it permits a developer to be easily tailored to a specific toner and copier by simple choice of a fluorinated carbon material with the appropriate ratio of fluorine to carbon atoms. This has not heretofore been possible with prior art developers. In the case of prior art developers based on fluorocarbon and fluoropolymer coatings, in order to vary the resistivity properties, as disclosed in U.S. Pat. No. 3,533,835, finely divided conductive particulate material such as carbon black, boron, aluminum bronze, antimony or other similar materials have been incorporated into the outer surface of the coated or uncoated carrier. Again, use of fluorinated carbon only as an additive in carrier coating compositions comprising fluorine containing resins as the major and hence effective coating agent as disclosed in the above-mentioned Japanese Patent Application No.: 1975-64,590, does not afford this advantage since the presence of the major amount of fluorine containing resin substantially interferes with the ability to easily and uniformly vary the electrical resistivity properties.

In the above connections, it is to be noted that despite the apparent similarity, in nomenclature, the term "fluorinated carbon" is not used for the purposes herein as embracing the same subject matter as "fluorocarbon" or as "fluoropolymer". Fluorinated carbon is a specific class of compositions which is prepared by the chemical addition of fluorine to one or more of the many forms of solid carbon. Fluorocarbons, on the other hand, are either aliphatic or aromatic organic compounds wherein one or more fluorine atoms have been attached to one or more carbon atoms to form well defined compounds with a single sharp melting point or boiling point. Fluoropolymers are linked-up single identical molecules which comprise long chains bound together by covalent bonds. Thus, despite, some apparent confusion in the art, it is apparent that fluorinated carbon is neither a fluorocarbon nor a fluoropolymer and the term is used in this context herein.

The present invention offers additional opportunities for improved performance characteristics, such as more uniform charging of toner particles, longer life, reduced photoconductor abrasion, improved flow characteristics, reduced humidity dependance and controllable surface electrical resistivity which would result in improved cost effectiveness.

DETAILED DESCRIPTION OF THE INVENTION AND OF THE PREFERRED EMBODIMENTS

Formation of the novel electrophotographic carriers of the invention and their use in electrophotographic processes may be accomplished by techniques well known in this art, as evidenced by U.S. Pat. No. 3,778,262 and U.S. Pat. No. 3,918,968.

The carrier core particles may be any of the well-known materials known in this art to which the fluorinated carbon coatings will adhere. Examples are metallic, metal oxide or glass beads or sand. The core size may range between about 50–1,000 microns.

The coating for the carrier core particles may consist of pure fluorinated carbon or a mixture of fluorinated carbon with other additives such as binders which promote the formation of a continuous film and adhesion to the core particles. Use of binders is preferred and, if employed, may be any material, especially polymers, which will accomplish the stated objective without adversely affecting the desired properties of the carrier in the system. Suitable binders may readily be identified by persons skilled in the art but include, for example, suitable polymers selected from thermoplastics such as polyolefins including polyethylene, polypropylene, chlorinated polyethylene, polystyrene, polymethylstyrene, polymethyl methacrylate, polybutyl methacrylate, polyacrylonitrile, polyvinyl acetate, polyvinyl alcohol, polyvinyl chloride, polyvinyl ethers and polyvinyl ketones; fluoropolymers such as polytetrafluoroethylene, polyvinyl fluoride, polyvinylidene fluoride and polyfluorotrichloroethylene; polyesters such as polyethylene terephthalate, polyurethanes, polysulfides, polycarbonates and their copolymers; thermosetting resins such as phenolformaldehyde, ureaformaldehyde, melamine-formaldehyde, polyesters, and epoxies; and other resins such as cellulose-based resins, silicones and halogenated rubber. Preferred binders are selected from the group consisting of styrene/acrylic copolymers, vinyl chloride-acetate copolymers and cellulose-based resins.

Mixtures of these resins may be employed. Use of fluorine containing resin binders, however, has to be controlled in order to avoid the presence of an unduly high proportion of a fluorine containing resin component in accordance with the invention. Pursuant to the invention, the resin component may not include a fluorine containing resin in an amount equal to or greater than the fluorinated carbon component. Preferably, the resin component does not include a fluorine containing resin in an amount greater than about 75 wt % of the fluorinated carbon component, still preferably not in an amount greater than about 50 wt % of the fluorinated carbon component and most preferably the resin component does not include any fluorine containing resin.

The binder concentration relative to the fluorinated carbon is not critical and may vary over a very broad range depending upon the particular fluorinated carbon and binder system used. The preferred range of binder concentration relative to fluorinated carbon is from about 50–99 weight %.

The fluorinated carbon material may be any of the fluorinated carbon materials as described herein. The methods for preparation of fluorinated carbon are well known and documented in the literature, such as in the following U.S. Pat. Nos. 2,786,874; 3,925,492; 3,925,263; 3,872,032 and 4,247,608.

Essentially, fluorinated carbon is produced by heating a carbon source such as amorphous carbon, coke, charcoal, carbon black or graphite with elemental fluorinate at elevated temperatures, such as 150°–600° C. A diluent such as nitrogen is preferably admixed with the fluorine. The nature and properties of the fluorinated carbon vary with the particular carbon source, the conditions of reaction and with the degree of fluorination obtained in the final product. The degree of fluorination in the final product may be varied by changing the process reaction conditions, principally temperature and time. Generally, the higher the temperature and the longer the time, the higher the fluorine content.

Fluorinated carbon of varying carbon sources and varying fluorine contents is commercially available from several sources. Preferred carbon sources are carbon black, crystalline graphite and petroleum coke.

One form of fluorinated carbon which is suitable for use in accordance with the invention is so-called polycarbon monofluoride which is usually written in the shorthand manner $CF_x$ with x generally being up to about 1.2. $CF_x$ has a lamellar structure composed of layers of fused six carbon rings with fluorine atoms attached to the carbons and lying above and below the plane of the carbon atoms. Preparation of $CF_x$ type fluorinated carbon is described, for example, in above-mentioned U.S. Pat Nos. 2,786,874 and 3,925,492.

Another form of fluorinated carbon which is suitable for use in accordance with the invention is that which has been postulated by Nobuatsu Watanabe as poly(dicarbon monofluoride) which is usually written in the shorthand manner $(C_2F)_n$ wherein n is indeterminate. Preparation of $(C_2F)_n$ type fluorinated carbon is described, for example, in above-mentioned U.S. Pat. No. 4,247,608 and also in Watanabe et al., "Preparation of Poly(dicarbon monofluoride) from Petroleum Coke", Bull. Chem. Soc. Japan, 55, 3197–3199 (1982).

As has been described herein, it is a major advantage of the invention to be able to vary the fluorine content of the fluorinated carbon to permit systematic uniform variation of the resistivity properties of the carrier. We know of no restriction on the fluorine content for purposes of this invention. The preferred fluorine content will depend on the equipment used, equipment settings and the particular toner selected for use. In the case of $CF_x$ type fluorinated carbon, for example, generally, x values from about 0.1 to about 1.2 represent the preferred working range from electrophotographic carrier purposes, with x values from about 0.25 to about 1.2 being preferred.

Coating of fluorinated carbon or fluorinated carbon resin mixtures onto the core particles may be accomplished by any suitable means such as tumbling, dipping, or spraying or fluidized bed procedures as is known in the art.

The optimum amount or thickness of the fluorinated carbon coating on the core particles is dependent upon the surface area of the core particles and hence the average carrier size and morphology. Enough of the fluorinated carbon must be present to impart the desired triboelectric properties, yet too thick a coating may result in cracking or peeling. Generally, the thickness of the coating may range from about 0.1–20 microns. The preferred coating thickness is from about 0.4–10 microns.

After the core particles are coated, the desired toner is added to form the developer mix. Choice of the toner material depends on its triboelectric behavior with the carrier.

As is well known in the art, illustrative suitable type toner materials include phenol-formaldehyde resins, methacrylic resins, polystyrene resins, rosins, polyamides and others. Suitable such toners are sold under various trademarks.

In the following examples, developer mixes in accordance with the invention were evaluated by a measurement of their toner-carrier triboelectric charge using the cascade technique described in U.S. Pat. No. 3,873,356 and by forming images of a test pattern on a photoconductor surface. Essentially, the triboelectric measurement technique comprises employing a circuit board in which the center portion has been isolated from the rest by a fine etched line. A ½ mil MYLAR sheet is heat-pressed over the copper electrodes and electrical wires are soldered to the inner and outer electrode areas for electrical contact. A DC scorotron (Mergenthaler 2000) is employed to apply a uniform negative charge to the MYLAR sheet surface. During charging, the inner portion of the circuit board is biased positive or negative 350 volts, depending on the polarity of the toner to be measured. After charging, both electrodes are grounded, and a non-contact electrostatic voltmeter is used to determine the voltage on the MYLAR surface. The circuit board is then inclined, and the toner/carrier mixture is cascaded over the MYLAR surface. If the polarity of the center electrode bias is properly chosen, the toner deposits on the inner portion of the circuit board, but not on the outer portion, which discharges the voltage on the inner portion of the circuit board. The resulting voltage can be converted to charge by the equation Q=CV where Q=charge in coulombs C=capacitance of capacitor in circuit ($10^{-8}$ farads)

V=Op-Amp voltage output

By determining the charge dissipated, Q, and by weighing the amount of toner deposited, m, the triboelectric charge, Q/m, is readily determined.

The photoconductors used in the examples are commercial organic photoconductors (James River Graphics) or zinc oxide coated paper, although any photoconductor known in the art may be used. The photoconductors were dark adapted and charged to −300 to −400 V apparent surface voltage (zinc oxide, OPC charged to −1000 to +1000 V) with a scorotron (Mergenthaler Linotype).

The image forming technique used in the examples was as follows:

Images were produced on a zinc oxide photoconductor or a James River Graphics organic photoconductor using magnetic brush development. The photoconductor was dark-adapted and mounted on the photoconductor transport plate of a copy robot. Proper adjustment of the transport motor drive and the photoconductor-scorotron gap permitted charging of the photoconductor to the appropriate apparent surface voltage (−350 to −400 on the zinc oxide photoconductor and −700 to −900 on the organic photoconductor). A test pattern (U.S. Air Force Resolution Target) was projected onto the charged photoconductor, which dissipated surface charges in the "white" areas of the test pattern. The electrostatic latent image was developed by brushing the photoconductor surface with a magnetic brush formed by the attracting carrier particles (and the adhering toner) using a Xerox 3100 magnetic brush assembly.

In the following examples, parts and percentages are by weight unless otherwise indicated.

EXAMPLE 1

1 Part (70:30) polystyrene/poly(methyl methacrylate) copolymer sold by Richardson as #269 was taken up in 20 parts of methylethylketone solvent. One hundred ninety eight parts Glidden A-227 electrolytic iron photocopier powder (particle size 150+325 mesh; apparent density 2.40-2.70 g/cm$^3$) were added and the solvent removed with agitation. The resulting coated powder was sieved to −140 mesh (U.S. Standard) to remove agglomerates and dried at 80° C. for 30 minutes. Xerox toner #6R189 (2% by weight) was added to form the developer mix. The triboelectric charge established on the toner was found to be −5.48 microcoulombs/gram (μC/g), by the measurement described herein and this developer produced an optically negative image of a test pattern on a negatively charged photoconductor by the image formation procedure described herein.

EXAMPLE 2

The procedure of Example 1 was repeated except that one part of Central Glass Co.'s fluorinated carbon ($C_2F$) was admixed with the Richardson copolymer #269. Central Glass' $C_2F$ is derived from crystalline graphite and is reported to contain 52% fluorine by weight and to have an average particle size of about 20 microns. The triboelectric charge established on the toner was −1.95 μC/g and the developer produced an optically negative image of a test pattern on a negatively charged photoconductor. This example shows that in the system described, $C_2F$ produces a more positive charge on the toner and therefore the $C_2F$ is making the carrier significantly more triboelectrically negative.

EXAMPLE 3

The procedure of Example 1 was repeated except that one part of Central Glass Co.'s fluorinated carbon ($CF_{1.0}$) was admixed with the Richardson copolymer #269. It is believed that Central Glass' $CF_{1.0}$ is derived from petroleum coke. It is reported to contain 61.8% fluorine by weight and to have an average particle size of about 10 microns. The triboelectric charge established on the toner was found to be +6.25 μC/g and this developer produced on optically positive image test pattern on a negatively charged photoconductor.

EXAMPLE 4

The procedure of Example 2 was repeated except that 1.5 parts of Richardson copolymer #269 were admixed with 0.5 part of Central Glass Co's $C_2F$. The developer was dried at 150° C. for one hour. The developer gave a negative image of a test pattern on a negatively charged photoconductor. The triboelectric charge on the toner was −13.3 μC/g.

EXAMPLE 5

The procedure of Example 3 was repeated except that uncoated HIZT standard carrier cores were tumbled for 5½ hours with 1% of the Central Glass $CF_{1.0}$ material and the coated carrier was then shaken with 2% of Royal Toner manufactured by Royal Typewriter Company. HITZ is a trademark of Indiana General Ferrite Products. The carrier material is a spheroidal ferrite material having a nominal size of 80 microns, a surface area of 220 cm$^2$/g and a bulk density of 2.7 g/cm$^3$. Royal Toner, manufactured by Konishiroku Photo Ind. Co., Inc. of Japan, is designed for RBC-115 copiers. It is composed of a styrene-acrylic resin mixture with carbon black, a polyalkane and a dye. When the electrostatic image was developed, an optically positive image resulted.

EXAMPLES 6–10

In order to demonstrate the variation of triboelectric charge of fluorinated carbon with variation in fluorine content, 100 grams of Glidden Electrolytic Iron (A-227) were tumbled with fluorinated carbon ($CF_x$ type) of various fluorine contents. The fluorinated carbon samples were from Ozark Mahoning. These samples are believed to be derived from graphite and are approximately of 10 micron particle size. The triboelectric charges established between these coated carriers and Xerox 6R189 are reported in the Table below. For comparison purposes, Example 6 describes the triboelectric charge observed using Xerox Developer 5R121 (no $CF_x$). Xerox Developer 5R121 is specified for use in a Xerox 3100 copier.

TABLE

Triboelectric Charge Produced by $CF_x$ - Coated Developer on Xerox 6R189 Toner as a Function of X Variation

| Example | Coating | X | Toner Tribocharge-microcoulombs/gram (μC/g) |
|---|---|---|---|
| 6 | Xerox Developer | — | −4.61 |
| 7 | $CF_x$ | 0.25 | +2.73 |
| 8 | $CF_x$ | 0.4 | +3.49 |
| 9 | $CF_x$ | 0.8 | +3.80 |
| 10 | $CF_x$ | 1.1 | +6.58 |

As can be seen from the Table, the triboelectric charge produced varied as a direct function of the X value. As discussed previously, the variable stoichiometry afforded by $CF_x$ allows a facile variation of its triboelectric properties and allows a developer to be easily tailored to a specific toner and copier.

EXAMPLE 11

Fluorinated carbon ($CF_x$), prepared from Columbia Carbon #975, which is a 0.03 micron carbon black (furnace black) and fluorinated to a composition $CF_{1.06}$, was coated onto Glidden Electrolytic Iron (A-277) by tumbling in a roller mill, as described in above Examples 6–10. The triboelectric charge obtained on the Xerox 6R189 toner was −7.08 μC/g. This negative triboelectric charge on the toner was unexpected in view of the positive triboelectric charges on the toner obtained with the other $CF_x$ materials described in Examples 7–10, and thus advantageously offers yet another range of triboelectric properties when using $CF_x$ based on a carbon black.

A variety of additives may be used in conjunction with the carriers of the invention or developers incorporating the same for various purposes. For example, quaternary ammonium salts have been used as charge control agents; $MoS_2$, $TiS_2$, $WS_2$ or graphite have been used to improve abrasion resistance; perfluorinated acids have been used to increase carrier lifetimes; and fatty acids and derivatives have been used to decrease humidity sensitivity, to name a few. Other suitable additives to achieve specific effects will readily occur to those skilled in the art.

We claim:

1. Electrophotographic development carrier particles for use with toner particles comprising a plurality of core particles coated with fluorinated carbon or a fluorinated carbon containing resin which resin is capable of binding the fluorinated carbon to the core particles without adversely affecting the desired triboelectric properties of the fluorinated carbon with the proviso that said resin component does not include a fluorine containing resin.

2. Electrophotographic development carrier particles in accordance with claim 1 wherein the core particles are coated with fluorinated carbon.

3. Electrophotographic development carrier particles in accordance with claim 1 in which the fluorinated carbon is derived from carbon black or petroleum coke.

4. Electrophotographic development carrier particles in accordance with claim 1 in which the fluorinated carbon is derived from crystalline graphite.

5. Electrophotographic development carrier particles in accordance with claim 1 in which the fluorinated carbon or fluorinated carbon compound is $(C_2F)_n$.

6. Electrophotographic development carrier particles in accordance with claim 1 in which the fluorinated carbon or fluorinated carbon component is $CF_x$.

7. Electrophotographic development carrier particles in accordance with claim 6 in which the fluorinated carbon or fluorinated carbon component has the formula $CF_x$ wherein x is from about 0.1 to about 1.2.

8. Electrophotographic development carrier particles in accordance with claim 1 in which the fluorinated carbon containing component has the formula $CF_x$ wherein x is from about 0.1 to about 1.2.

9. Electrophotographic development carrier particles in accordance with claim 8 in which the fluorinated carbon is derived from carbon black or petroleum coke.

10. Electrophotographic development carrier particles in accordance with claim 8 wherein the core particles are coated with a fluorinated carbon containing resin selected from the group consisting of styrene/acrylic copolymers, vinyl chloride-acetate copolymers and cellulose-based resins.

11. An electrophotographic process comprising:

(a) forming an electrostatic image on the surface of a photoconductive member, and (b) contacting the image with a developer mixture comprising finely divided toner particles mixed with carrier particles as described in claim 1.

12. A process as described in claim 11 in which the core particles are coated with fluorinated carbon.

13. A process as described in claim 1 in which the fluorinated carbon is $(C_2F)_n$.

14. A process as described in claim 13 in which the fluorinated carbon is derived from crystalline graphite.

15. A process as described in claim 1 in which the fluorinated carbon has the formula $CF_x$ wherein x is from about 0.1 to about 1.2.

16. A process as described in claim 15 in which the $CF_x$ is derived from carbon black or petroleum coke.

* * * * *